US007667206B1

(12) United States Patent
Hindi et al.

(10) Patent No.: US 7,667,206 B1
(45) Date of Patent: Feb. 23, 2010

(54) NEUTRON SOURCE DETECTOR

(75) Inventors: Munther M. Hindi, Campbell, CA (US); Lee M. Klynn, Los Altos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/949,682

(22) Filed: Dec. 3, 2007

Related U.S. Application Data

(63) Continuation-in-part of application No. 11/837,454, filed on Aug. 10, 2007, which is a continuation-in-part of application No. 10/866,760, filed on Jun. 15, 2004, now Pat. No. 7,274,020.

(60) Provisional application No. 60/484,850, filed on Jul. 3, 2003.

(51) Int. Cl.
*G01T 3/00* (2006.01)
*G01T 1/20* (2006.01)

(52) U.S. Cl. .............................. 250/390.07; 250/363.01

(58) Field of Classification Search ............ 250/390.01, 250/390.04, 390.07, 390.11, 363.01, 363.03
See application file for complete search history.

(56) References Cited

U.S. PATENT DOCUMENTS

| 4,377,751 | A | * | 3/1983 | Kronenberg et al. ..... 250/474.1 |
| 4,942,302 | A | | 7/1990 | Koechner |
| 5,103,098 | A | | 4/1992 | Fenyves |
| 5,410,156 | A | * | 4/1995 | Miller .................... 250/390.04 |
| 5,446,286 | A | | 8/1995 | Bhargava |
| 5,665,971 | A | * | 9/1997 | Chen et al. ................ 250/385.1 |
| 5,821,541 | A | | 10/1998 | Tümer |
| 5,943,388 | A | | 8/1999 | Tümer |

(Continued)

OTHER PUBLICATIONS

Terasawa, et al., "A Small Scintillating Fiber Camera Consisting of 0.25-mm Square Fibers for Space Dosimetry," IEEE Transactions On Nuclear Science, Aug. 2001, pp. 1118-1121, vol. 48, No. 4.

(Continued)

*Primary Examiner*—David P Porta
*Assistant Examiner*—Faye Boosalis
(74) *Attorney, Agent, or Firm*—McDermott Will & Emery LLP

(57) ABSTRACT

A neutron source detector is provided for detecting and determining an energy spectrum of a neutron source and a direction to the neutron source. The neutron source detector includes a detection system configured to detect and record the location and energy of interaction between a detector and a recoil proton produced by a scattering of a neutron emitted by the neutron source. A processor is configured to determine the energy of each of a plurality of recoil protons produced by respective scatterings of a neutron based on the recorded locations and energies of interactions of the recoil protons and determine and order scatter locations of the scattered neutron based on the determined energies of the recoil protons. A direction of the scattered neutron is determined based on the order of the scatter locations. The direction to the neutron source is determined based on the determined directions of a plurality of scattered neutrons, and the energy spectrum of the neutron source is determined based on the determined direction to the neutron source, the determined directions of the plurality of scattered neutrons, and the determined energies of the plurality of recoil protons produced by the respective plurality of scattered neutrons.

25 Claims, 10 Drawing Sheets

U.S. PATENT DOCUMENTS

| | | |
|---|---|---|
| 6,281,509 B1 | 8/2001 | Ryan et al. |
| 6,420,711 B2 | 7/2002 | Tümer |
| 6,484,051 B1 | 11/2002 | Daniel |
| 6,528,795 B2 | 3/2003 | Kurfess et al. |
| 6,693,291 B2 | 2/2004 | Nelson et al. |
| 6,710,349 B2 | 3/2004 | Shao |
| 6,737,103 B2 | 5/2004 | Polichar et al. |
| 6,775,348 B2 | 8/2004 | Hoffman |
| 6,906,559 B2 | 6/2005 | Tümer |
| 6,989,541 B2 | 1/2006 | Penn |
| 7,274,020 B1 | 9/2007 | Hindi et al. |
| 2004/0174950 A1 | 9/2004 | Polichar et al. |
| 2006/0049357 A1 | 3/2006 | Tümer |
| 2006/0049362 A1 | 3/2006 | Friedman et al. |
| 2006/0202125 A1 | 9/2006 | Suhami |

OTHER PUBLICATIONS

Ryan, et al., "Sontrac: An Imaging Spectrometer for Solar Neutrons," Proceedings of SPIE, 2003, pp. 399-410, vol. 4853.

Wulf, et al., "Thick Silicon Strip Detector Compton Imager," IEEE Transactions On Nuclear Science, Oct. 2004, pp. 1997-2003, vol. 51, No. 5.

Bravar, et al., "FNIT: The Fast Neutron Imaging Telescope for SNM Detection," Proc. of SPIE, 2006, pp. 62130G 1-9, vol. 6213.

* cited by examiner

NEUTRON SOURCE DETECTOR

This application is a continuation-in-part of U.S. application Ser. No. 11/837,454 filed on Aug. 10, 2007, which is a continuation-in-part of U.S. application Ser. No. 10/866,760 filed on Jun. 15, 2004, which issued as U.S. Pat. No. 7,274,020 on Sep. 25, 2007, and which claims the benefit of U.S. Provisional Application No. 60/484,850 filed on Jul. 3, 2003, all of which are hereby incorporated by reference.

STATEMENT AS TO RIGHTS TO INVENTIONS MADE UNDER FEDERALLY SPONSORED RESEARCH OR DEVELOPMENT

Not applicable.

FIELD OF THE INVENTION

The invention generally concerns radiation detection, and more particularly concerns a neutron source detector for detecting and determining the energy spectrum of a neutron source and the direction to the neutron source.

BACKGROUND OF THE INVENTION

Radiation detection technology plays a significant role in health and safety applications. These applications include diagnostic systems used for medical imaging or non-destructive testing. Safety applications include systems used for mapping hot spots after nuclear accidents and for monitoring leakage of radioactive waste during storage or transportation. As the amount and availability of nuclear material increases throughout the world, the need to detect and identify dirty bombs and nuclear weapons places greater demands on the development of radiation detection technology.

The materials used in radiological weapons, such as dirty bombs, emit a significant number of gamma rays. Special nuclear materials, such as those defined by Title I of the Atomic Energy Act of 1954, emit very few gamma rays but could emit significantly more neutrons. Both gamma rays and neutrons have typical mean free distances in air on the order of 100 meters and therefore the sources of gamma rays and neutrons are detectable from a distance. However, conventional detection systems incorporate designs that focus on the detection of either gamma rays or neutrons but are not capable of detecting both types of radiation efficiently.

SUMMARY OF THE INVENTION

The invention provides a system for detecting neutrons emitted by a neutron source and determining an energy spectrum of the neutron source and a direction to the neutron source. The system relies on interactions between a detector and recoil protons generated within the detector by the elastic scatterings of neutrons incident to the detector. The locations and intensities of the interactions between recoil protons and the detector are recorded and applied to algorithms to determine the energy spectrum of the source of the neutrons and the direction to that neutron source. The algorithms are devised such that they may be implemented within a system that is capable of implementing other algorithms to detect gamma ray sources.

According to one aspect of the invention, a neutron source detector is provided for detecting and determining an energy spectrum of a neutron source and a direction to the neutron source. The neutron source detector includes a detection system configured to detect and record the location and energy of interaction between a detector and a recoil proton produced by a scattering of a neutron emitted by the neutron source. A processor is configured to determine the energy of each of a plurality of recoil protons produced by respective scatterings of a neutron based on the recorded locations and energies of interactions of the recoil protons and determine and order scatter locations of the scattered neutron based on the determined energies of the recoil protons. A direction of the scattered neutron is determined based on the order of the scatter locations. The direction to the neutron source is determined based on the determined directions of a plurality of scattered neutrons, and the energy spectrum of the neutron source is determined based on the determined direction to the neutron source, the determined directions of the plurality of scattered neutrons, and the determined energies of the plurality of recoil protons produced by the respective plurality of scattered neutrons.

According to another aspect of the invention, a method is described for detecting and determining an energy spectrum of a neutron source and a direction to the neutron source. The method includes detecting and recording the locations and energies of interactions between a detector and a plurality of recoil protons produced by the scattering of a plurality of neutrons emitted by the neutron source. The energy of each of the plurality of recoil protons is determined based on the recorded locations and energies of the interactions of the recoil protons. Scatter locations of the scattered neutrons are determined and ordered based on the determined energies of the recoil protons. A direction of each scattered neutron is determined based on the order of the scatter locations. The direction to the neutron source is determined based on the determined directions of the plurality of scattered neutrons and the energy spectrum of the neutron source is determined based on the determined direction to the neutron source, the determined directions of the plurality of scattered neutrons, and the determined energies of the plurality of recoil protons produced by respective one of the plurality of scattered neutrons.

According to another aspect of the invention, a computer-readable medium is provided having computer-executable instructions stored thereon for execution by a processor to perform a method for detecting and determining an energy spectrum of a neutron source and a direction to the neutron source. The method includes detecting and recording the locations and energies of interactions between a detector and a plurality of recoil protons produced by the scattering of a plurality of neutrons emitted by the neutron source. The energy of each of the plurality of recoil protons is determined based on the recorded locations and energies of the interactions of the recoil protons. Scatter locations of the scattered neutrons are determined and ordered based on the determined energies of the recoil protons. A direction of each scattered neutron is determined based on the order of the scatter locations. The direction to the neutron source is determined based on the determined directions of the plurality of scattered neutrons and the energy spectrum of the neutron source is determined based on the determined direction to the neutron source, the determined directions of the plurality of scattered neutrons, and the determined energies of the plurality of recoil protons produced by respective one of the plurality of scattered neutrons.

According to another aspect of the invention, a neutron source detector is provided for detecting and determining an energy spectrum of a neutron source and a direction to the neutron source. The neutron source detector includes a detection system configured to detect and record a track of a recoil proton produced by a scattering of an incident neutron emitted by the neutron source. A processor is configured to determine the energy and direction of the recoil proton based on the track of the recoil proton recorded by said detection system, and to determine the energy spectrum of the neutron source and the direction to the neutron source based on the determined energies and directions of a plurality of recoil protons produced by the single scatterings of a respective plurality of incident neutrons.

According to another aspect of the invention, a neutron source detector is provided for detecting and determining an energy spectrum of a neutron source and a direction to the neutron source. The neutron source detector includes a detection system configured to detect and record the location and energy of interaction between a detector and a recoil proton produced by a scattering of a neutron emitted by the neutron source. A processor is configured to determine the energy of each of a plurality of recoil protons produced by respective scatterings of a neutron based on the recorded locations and energies of the interactions of the recoil protons. Three scatter locations of the scattered neutron are determined and ordered based on the determined energies of the recoil protons. A direction of the scattered neutron after a first scattering and a direction of the scattered neutron after a second scattering are determined based on the order of the three scatter locations. The energy of the scattered neutron after the first scattering is determined based on the determined directions of the scattered neutron after the first and second scatterings and the determined energy of the recoil proton produced by the second scattering of the neutron. An angle of scattering of the first scattering of the neutron and an energy of the neutron are determined based on the determined energies of the scattered neutron after the first scattering and the recoil proton produced by the first scattering of the neutron. The energy spectrum of the neutron source is determined based on the determined energies of a plurality of neutrons. A direction to the neutron source is determined based on the angles of scattering of the first scatterings of the plurality of neutrons.

The foregoing summary of the invention has been provided so that the nature of the invention can be understood quickly. A more detailed and complete understanding of the preferred embodiments of the invention can be obtained by reference to the following description of the invention together with the associated drawings.

DETAILED DESCRIPTION OF THE INVENTION

The detailed description of the invention set forth below in connection with the associated drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without all of the specific details contained herein. In some instances, well known structures and components are shown in block diagram form in order to avoid obscuring the concepts of the invention.

Figure 1:
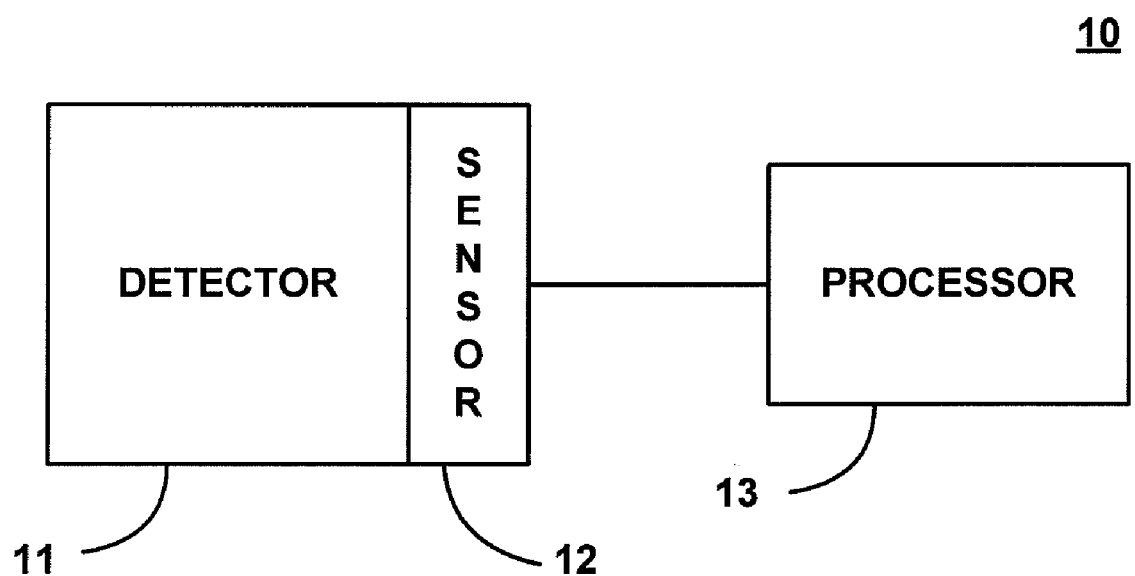
FIG. 1 is a block diagram depicting components of a neutron source detector according to one embodiment of the invention.

FIG. 1 is a block diagram depicting basic components of a neutron source detector according to one embodiment of the invention. As shown in FIG. 1, neutron source detector 10 includes a detector 11, a sensor 12 and a processor 13. Detector 11 and sensor 12 are part of a detection system configured to detect and record the location and energy of interaction between detector 11 and a recoil proton produced by the elastic scattering of an incident neutron in detector 11. Detector 11 is constructed to scatter incident neutrons and interact with the produced recoil protons so as to facilitate detection of the location and associated energy of the recoil protons. Sensor 12 records the locations and energies of interactions between detector 11 and the recoil protons. Using the recorded locations and energies, processor 13 is configured to determine the scatter locations at which the recoil protons are generated and the energies of the recoil protons. These scatter locations and energies are then used to determine an energy spectrum of the source of the incident neutrons and a direction to the neutron source. The components of neutron source detector 10, together with their associated operating processes, are described in more detail below.

The operation of neutron source detector 10 is based on the behavior of neutrons inside an appropriate detecting material of detector 11 in which the neutrons are scattered and deposit energy at scatter locations within the material. These deposits of energy produce recoil protons within the detecting material. According to one embodiment, detector 11 is constructed using a material that scatters incident neutrons and generates scintillation light as the produced recoil protons traverse the material and interact with the material by releasing energy gained from the scatterings. Sensor 12 records the locations and energies of the recoil protons by recording the locations of the scintillation light generated by the recoil protons within detector 11 together with the intensities of that scintillation light.

Figure 2:
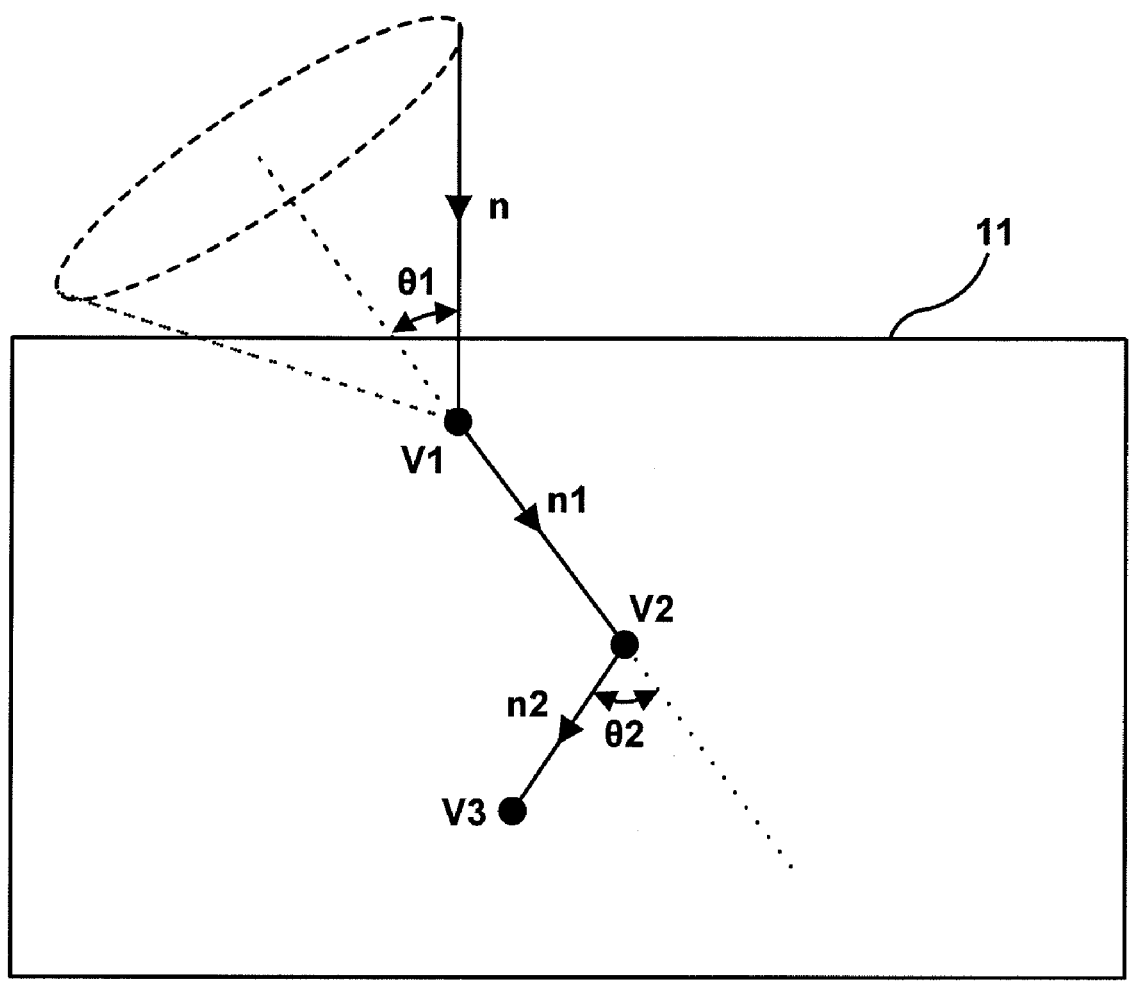
FIG. 2 is a diagram depicting the scattering of a neutron in a detecting material.

FIG. 2 is a diagram depicting the scattering of an incident neutron within a material of detector 11. As shown in FIG. 2, an incident neutron n enters the detecting material of detector 11 and is scattered at point V1 with a scattering angle of $\theta 1$. The scattered neutron n1 continues within detector 11 until it is scattered a second time at point V2 with a scattering angle of $\theta 2$. The scattered neutron n2 continues further within detector 11 until it is scattered a third time at point V3. While FIG. 2 depicts incident neutron n being scattered three times within detector 11, this is simply one example of a path of the incident neutron n within detector 11 and is not intended to represent the only possible path within detector 11. Depending on the energy of incident neutron n and the configuration and materials of detector 11, incident neutron n may scatter fewer than three times or more than three times within detector 11. Additionally, the scattered neutron may be absorbed within detector 11 after one or more scatterings or exit without further interaction.

At each scatter location, represented by points V1, V2 and V3 in FIG. 2, a recoil proton (not shown) is produced within detector 11. Each recoil proton traverses a portion of detector 11 and interacts with detector 11 by releasing the energy gained from the neutron scattering. As described in more detail below, detecting and recording the energy released by the recoil protons produced by the scatterings of multiple incident neutrons n in detector 11 facilitates the determination of an energy spectrum of the source of the neutrons and a direction to that source.

Figure 3:
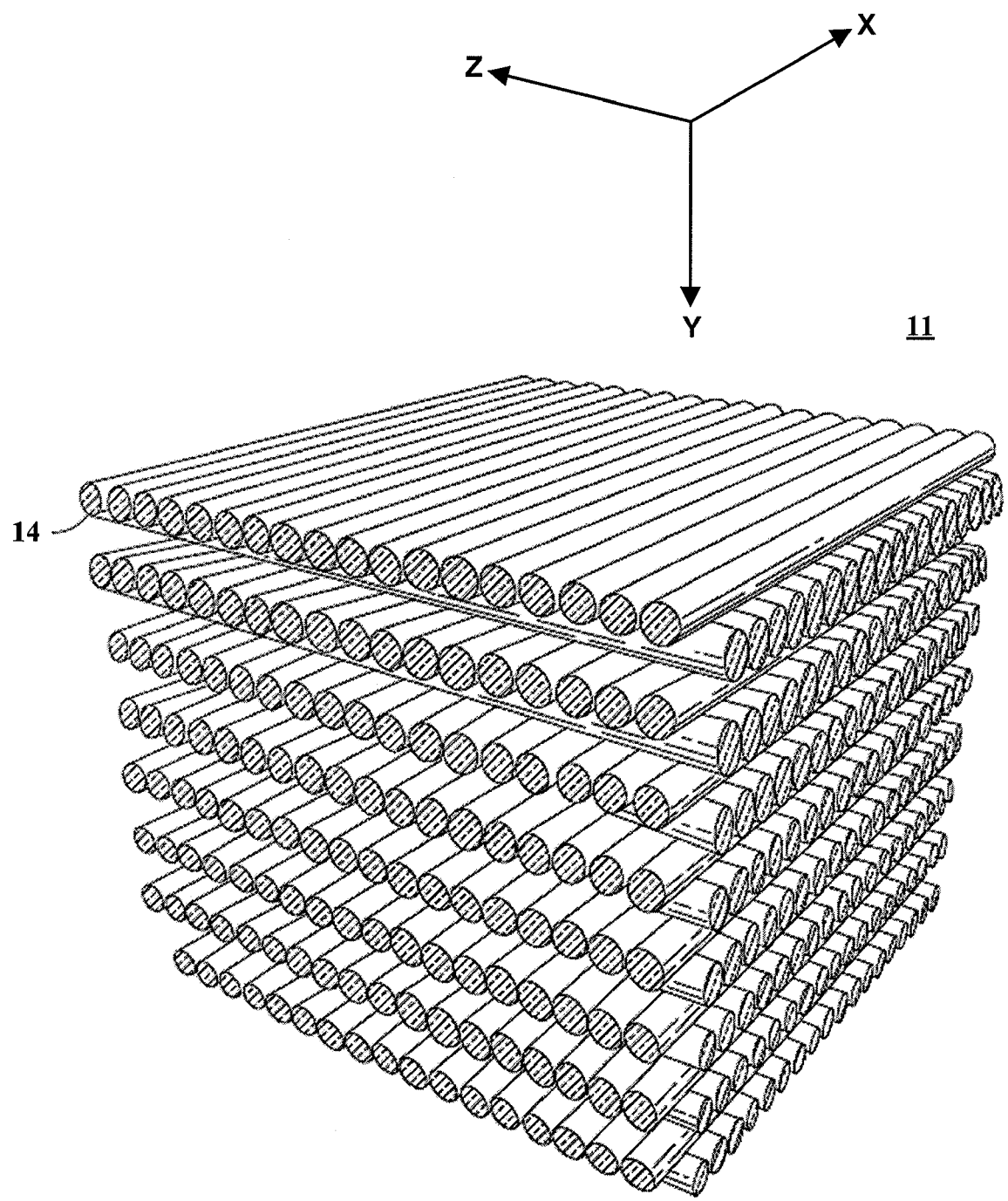
FIG. 3 is a drawing depicting a configuration of a detector according to one embodiment of the invention.

FIG. 3 is a drawing depicting a construction of detector 11 according to one embodiment of the invention. In this example, detector 11 is constructed using multiple layers of fiber-optic scintillators 14 to form a block. The fiber-optic scintillators 14 used to form each layer are arranged parallel to each other in a plane and are oriented in a direction that is orthogonal to the direction of the fiber-optic scintillators 14 in adjacent layers. In this manner, half of the fiber-optic scintillators 14 used to form the block are parallel to the z-axis and terminate in the x-y plane, while the other half of the fiber-optic scintillators 14 are parallel to the x-axis and terminate in the y-z plane.

Parent application Ser. Nos. 10/866,760 (now U.S. Pat. No. 7,274,020) and 11/837,454, which have been incorporated by reference, describe various embodiments of a gamma vector camera that use a detector arranged as shown in FIG. 3 to detect and determine the energy and direction of incident gamma rays. As described in more detail in the parent applications, the materials and dimensions of the detector are selected using a number of design parameters. For example, the fiber-optic scintillators are made of a material, such as polystyrene, having an atomic number Z suitable for scattering incident gamma rays within the detector and for minimizing large-angle deflections of recoil electrons traveling through the material. In addition, the dimensions of both the detector and the individual fiber-optic scintillators are selected based on the expected energy ranges of the incident gamma rays and the recoil electrons produced by the scatterings of those gamma rays.

The systems described in the parent applications rely on the recoil electrons traversing multiple layers of fiber-optic scintillators in the detector in order to detect a three-dimensional position of the recoil electrons within the detector. Recoil protons, on the other hand, typically have energies that are too low to allow the protons to traverse the width/diameter of a single fiber-optic scintillator used in the gamma vector camera configurations. Accordingly, recoil protons generated in these detector configurations typically are generated and stop within the same fiber.

Neutron source detector 10 is configured to use a detector such as that described in the parent applications. To facilitate the detection of the three-dimensional position of recoil protons within detector 11, fiber-optic scintillators 14 having different properties from those described in the parent applications are used to construct detector 11. According to one embodiment, fiber-optic scintillators 14 include two dyes within the fiber. The first dye absorbs ionization energy of the recoil proton and emits ultraviolet (UV) photons. The second dye absorbs the emitted UV photons and emits visible scintillation light. The range within detector 11 of the UV photons is dependent on the concentration of the wavelength shifting (WLS) second dye. Selecting an appropriate concentration of the WLS second dye and/or varying the diameter of the fiber-optic scintillators 14, allows the majority of the UV photons to be absorbed either in the fiber in which they were generated or in neighboring fibers nearest to that fiber. According to one embodiment of the invention, the properties of the fiber-optic scintillators 14 are selected such that the range of the UV photons is approximately one to two times the diameter of the fiber-optic scintillators 14. Fiber-optic scintillators providing for a longer range of UV photons may be selected in alternative embodiments of the invention.

A portion of the visible scintillation light generated by the WLS second dye is trapped and travels down the axis of respective fiber-optic scintillators 14 in which the UV photons are generated, as well as the neighboring fiber-optic scintillators 14, where it can be detected at the respective ends of the fiber-optic scintillators 14. By identifying which fiber-optic scintillators 14 produce the scintillation light, the three-dimensional location of the recoil proton is determined based on the XY positions and the YZ positions of the fibers that produce the scintillation light.

Figure 4:
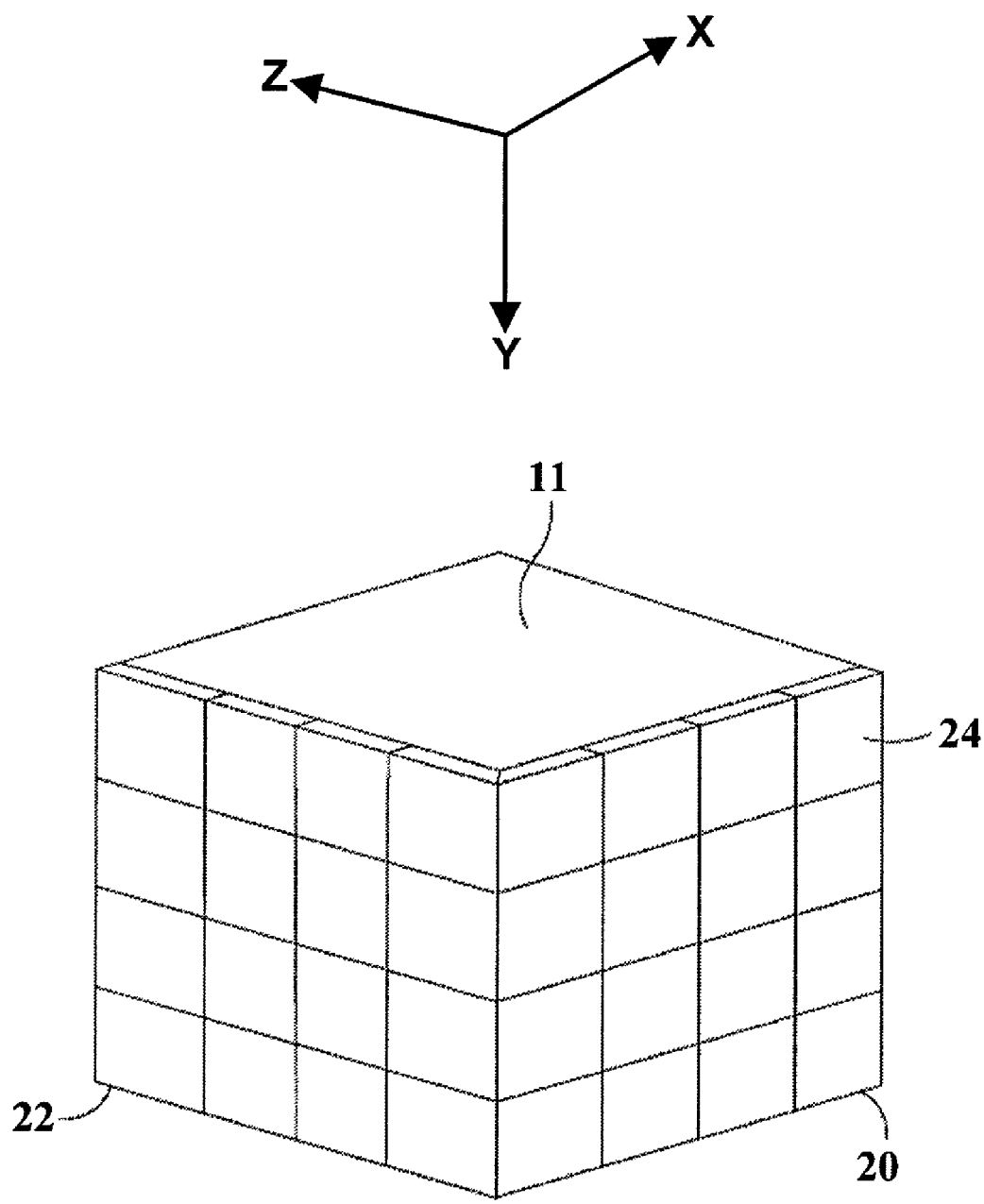
FIG. 4 is a drawing depicting a configuration of a detector and sensors of a neutron source detector according to one embodiment of the invention.

As mentioned above, the location of a recoil proton is determined based on the fiber-optic scintillators 14 that produce scintillation light in detector 11. To detect this scintillation light, a pair of photo sensor arrays is positioned adjacent to detector 11. When detector 11 is arranged as depicted in FIG. 4, an x-y photo sensor array 20 is positioned adjacent to the ends of the fiber-optic scintillators 14 arranged parallel to the z-axis and a y-z photo sensor array 22 is positioned adjacent to the ends of the fiber optic scintillators 14 arranged parallel to the x-axis. Constructing detector 11 and sensor 12 in this manner provides a neutron source detector having a spherical field of view with nearly uniform sensitivity.

Each of photo sensor arrays 20 and 22 comprises multiple pixel elements 24 arranged to correspond with the ends of the fiber-optic scintillators 14 adjacent to the respective photo sensor array. Pixel elements 24 may be arranged in a one-to-one correspondence with the adjacent fiber-optic scintillators 14. Alternatively, more than one pixel element 24 may be arranged in correspondence with each of the adjacent fiber-optic scintillators 14. The pixel elements 24 record the light intensity of the scintillation light produced by the adjacent fiber-optic scintillators 14.

Photo sensor arrays 20 and 22 may be implemented using charge-coupled devices (CCDS) having a resolution sufficient for the number of fiber-optic scintillators 14 in detector 11. CCDs are readily available at relatively low cost and therefore provide a cost-effective implementation of photo sensor arrays 20 and 22. Alternatively, each of the photo sensor arrays 20 and 22 may be implemented using a linear photodiode array, a linear phototransistor array, an avalanche photodiode array, a CMOS array, a microchannel plate, or position-sensitive photomultiplier tubes.

As incident neutrons interact with detector 11, scattering events are recorded using photo sensor arrays 20 and 22. Specifically, when an incident neutron scatters within detector 11 producing a recoil proton, the event is recorded by reading the respective light intensities of the scintillation light recorded by pixel elements 24 in photo sensor arrays 20 and 22 and storing the light intensities together with the coordinates of the respective pixel elements 24 in an event list. For each event, an x-y event list is created containing data entries of the (x,y) coordinates of the pixel elements 24 that recorded scintillation light in the x-y photo sensor 20 together with the associated recorded light intensity, and a y-z event list is created containing data entries of the (y,z) coordinates of the pixel elements 24 that recorded scintillation light in the y-z photo sensor 22 together with the associated recorded light intensity. Also included in the data entries is the time the light intensity was recorded.

The timing for recording scattering events may be implemented using any of a number of techniques. For example, photo sensor arrays 20 and 22 may be read and processed at a regular interval. The number of recorded frames per second may be varied based on the specifications of different implementations of the neutron source detector. The frequency of the intervals is set at a rate high enough to reduce the chance that the scatterings of multiple incident neutrons are captured and recorded within a single interval. This frequency will vary depending on the type of neutron source being detected and the distance between the detector and the neutron source.

Figure 5:
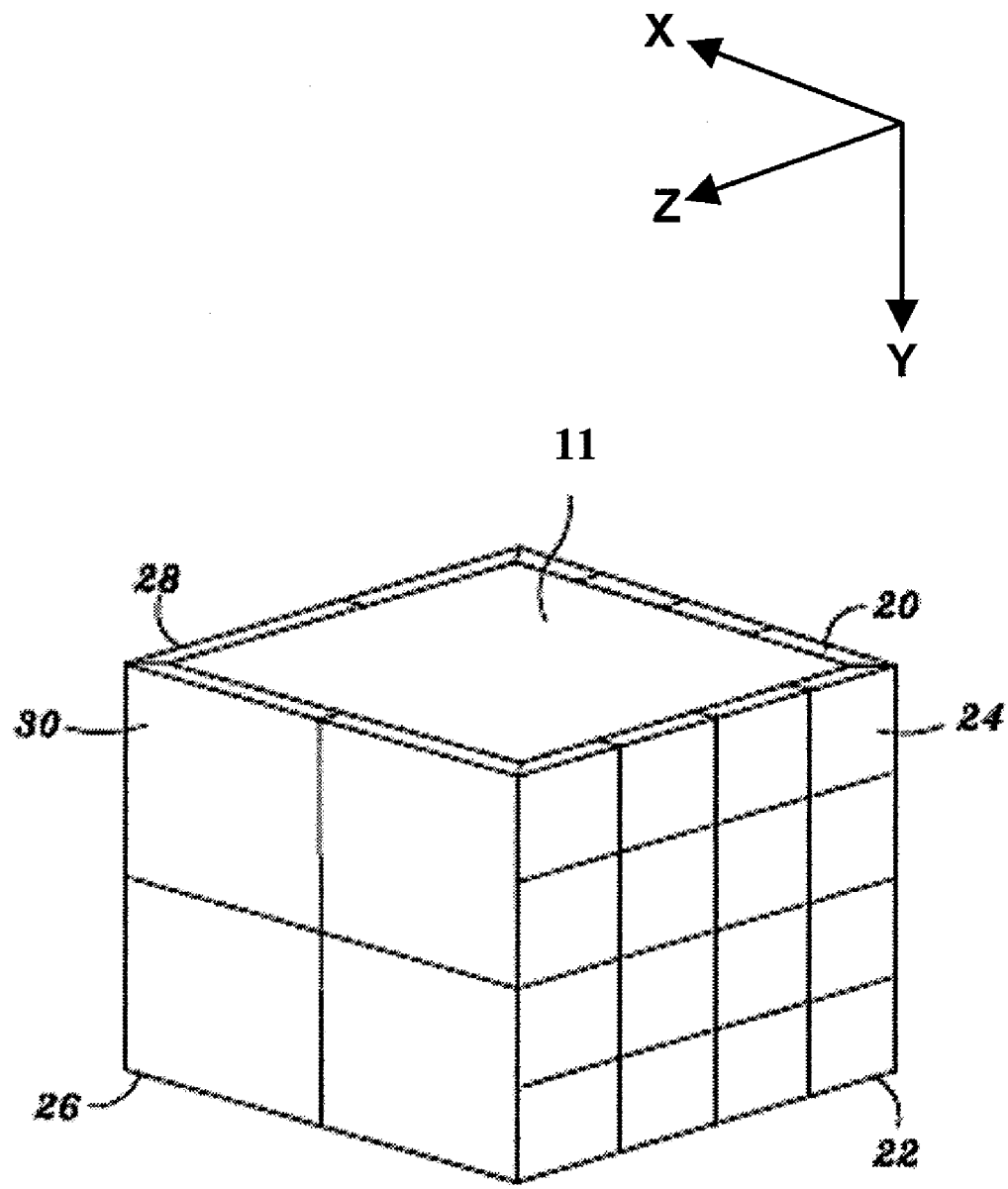
FIG. 5 is a drawing depicting a configuration of a detector and sensors of a neutron source detector according to one embodiment of the invention.

Alternatively, photo sensor arrays 20 and 22 may be read and processed using a triggering implementation. According to one embodiment of the invention, an array of diode triggers for each of photo sensors arrays 20 and 22 are used to trigger the reading and processing of a portion of the pixel elements 24 in photo sensors arrays 20 and 22. FIG. 5 depicts the construction of detector 11 and sensor 12 using this alternative embodiment. As shown in FIG. 5, fast sensor arrays 26 and 28, which are comprised of diode triggers 30, are arranged at opposite ends of the fiber-optic scintillators 14 from x-y photo sensor array 20 and y-z photo sensor array 22. Each of diode triggers 30 corresponds to a number of pixel elements 24 in the corresponding photo sensor array. For example, FIG. 5 shows a ratio of one diode trigger 30 for every four pixel elements 24. When one of diode triggers 30 detects scintillation light at the end of one or more fiber-optic scintillators 14, the pixel elements 24 corresponding to the particular diode trigger 30 are read and recorded. In this manner, only those pixel elements 24 that are in the area where scintillation light has been generated are recorded. By matching the times when diode triggers 30 detect scintillation light and cause a portion of pixel elements 24 to be read, detected scintillation light associated with the same event is matched. The numbers of pixel elements 24 and diode triggers 30 depicted in FIGS. 4 and 5 are for description purposes only. One skilled in the art will recognize that the actual numbers of pixel elements 24 and diode triggers 30 may vary and typically will exceed the numbers depicted in the figures.

In an alternative embodiment, image intensifiers (not shown) are arranged between the detector 11 and each of photo sensor arrays 20 and 22. A control system is used to monitor for the coincident amplification of light by both image intensifiers as an indicator of a scattering event within detector 11. Upon detecting coincident amplification, photo sensor arrays 20 and 22 are read and processed to record the event. Such a scintillation event capture system is described in U.S. patent application Ser. No. 11/595,567, which was filed on Nov. 10, 2006, and is hereby incorporated by reference.

Noise reduction techniques may be employed to distinguish scintillation light from noise in photo sensor arrays 20 and 22. For example, known noise reduction algorithms may be used to remove a noise component from the intensity recorded by pixel elements 24. Alternatively, additional pixel elements 24 that do not correspond to any of fiber-optic scintillators 14 may be used in real time to record any noise in the system, which is then removed from the intensities recorded by pixel elements 24 that do correspond to fiber-optic scintillators 14. One skilled in the art will recognize that other noise reduction algorithms and systems may be employed within the scope of the present invention.

Figure 6:
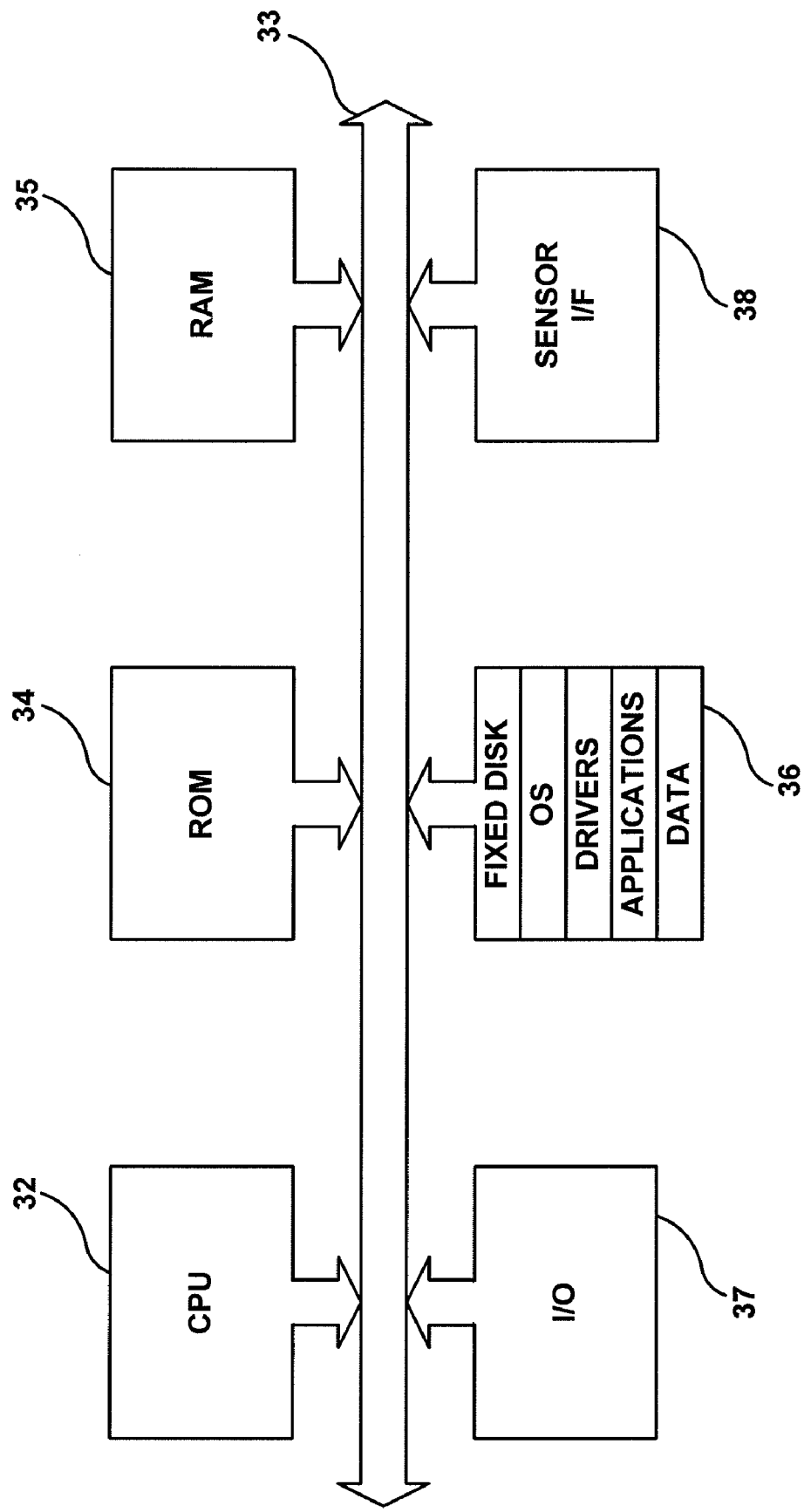
FIG. 6 is a block diagram depicting components of a processor of a neutron source detector according to one embodiment of the invention.

FIG. 6 is a block diagram depicting the basic components of processor 13 according to one embodiment. In particular, processor 13 comprises a central processing unit such as a programmable microprocessor (CPU) 32 that is interfaced to a bus 33. Also interfaced to bus 33 are read-only memory (ROM) 34, random-access memory (RAM) 35, fixed disk 36, input/output interface (I/O) 37 and sensor interface (I/F) 38.

CPU 32 executes program instructions sequences that have been loaded into RAM 35, which acts as a main run-time memory for CPU 32. The program instructions sequences are loaded into RAM 35 by CPU 32 from fixed disk 36 or some other computer-readable medium. Other examples of computer-readable media include, but are not limited to, other forms of magnetic media, optical media such as CD-ROM and DVD, electronic media such as Flash memory, etc. Fixed disk 36 stores program instruction sequences of multiple software modules. The software modules stored in fixed disk 36 include, but are not limited to, an operating system for managing the software applications and resources of processor 13; drivers for controlling and communicating with peripheral devices attached to processor 13 via I/O interface 37 and sensor I/F 38; application modules for performing the processes used to implement the present invention, which are described in detail below; and data such as event lists and data representing the energy and direction of incident neutrons reconstructed according to the present invention. ROM 34 stores invariant instruction sequences to be executed by CPU 32, such as start-up instruction sequences and basic input/output system (BIOS) instruction sequences, for the operation of certain peripheral devices attached to processor 13. I/O interface 37 provides an interface to processor 13 for input-output devices such as a keyboard, pointing device, monitor, printer, etc. Sensor interface 38 provides an interface between processor 13 and the photo sensor arrays of sensor 12.

Processor 13 can be implemented using a general purpose computer such as a PC-compatible computer or laptop to which sensor 12 is interfaced. In addition, the internal components of processor 13 described above can be incorporated into a single apparatus together with detector 11 and sensor 12. Alternatively, processor 13 and the processes associated with the present invention may be implemented completely in hardware using logical circuits such as gate arrays.

Referring back to FIG. 2, the scatterings of incident neutrons will now be described in more detail. As previously discussed, FIG. 2 depicts three scatterings of an incident neutron n. If all of the scatterings are from protons (the hydrogen in polystyrene), the following relation holds at each scattering location (V1, V2, V3):

$$K_n = K_{n1} + K_p \quad (1)$$

wherein $K_n$ is the kinetic energy of the incident neutron, $K_{n1}$ is the kinetic energy of the scattered neutron and $K_p$ is the kinetic energy of the recoil proton. For neutrons from special nuclear material, the kinetic energies (~0-10 MeV) are low enough that non-relativistic kinematics can be used and the kinetic energies can be expressed as $K = mv^2/2$. Using this equation, equation (1) above becomes:

$$\frac{1}{2}m_n v_n^2 = \frac{1}{2}m_n v_{n1}^2 + \frac{1}{2}m_p v_p^2 \quad (2)$$

where m is the mass and v is the velocity of the relevant particle. To an excellent approximation, $m_n=m_p$, which reduces equation (2) to the following equation:

$$v_n^2 = v_{n1}^2 + v_p^2 \quad (3)$$

Figure 7:
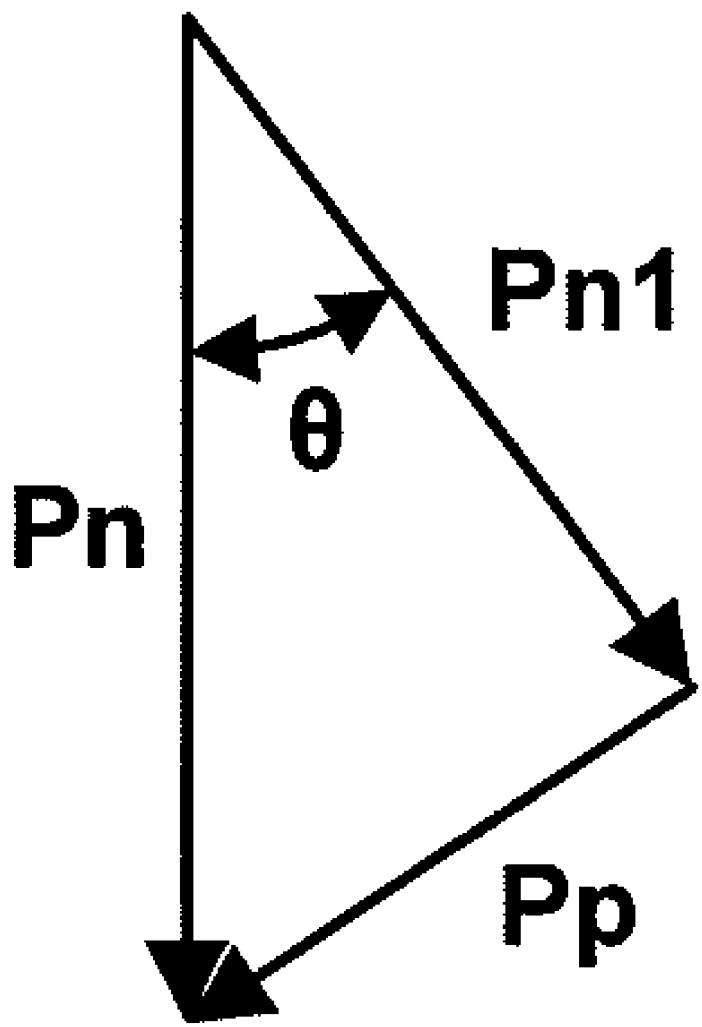
FIG. 7 is a diagram depicting the momentum components of an incident neutron, a scattered neutron and a recoil proton.

FIG. 7 depicts a representation of the momentum conservation at the scatter point/location V1 in FIG. 2. The momentum conservation is represented by the following equation:

$$p_n = p_{n1} + p_p \quad (4)$$

where p stands for the momentum vector. Using the relationships of p=mv and $m_n=m_p$, equation (4) becomes:

$$v_n^2 = v_{n1}^2 + v_p \quad (5)$$

Squaring both sides of equation (5) (i.e., taking the dot product of each side with itself) produces the following equation:

$$v_n^2 = v_{n1}^2 + v_p^2 + 2v_{n1}v_p\cos(\phi) \quad (6)$$

where $\phi$ is the angle between the scattered neutron direction and the recoil proton direction. By comparing equations (3) and (6) above, one deduces that $\cos(\phi)=0$ and therefore $\phi=90°$. That is, the scattered neutron and the recoil proton directions are perpendicular to each other and the triangle depicted in FIG. 7 is a right-angled triangle. From that triangle, it follows that:

$$p_{n1} = p_n \cos(\theta) \quad (7)$$

and, since $K=p^2/2\,m$, the following relationship is established:

$$K_{n1} = K_n \cos^2(\theta) \quad (8)$$

Equation (8) relates the energy of the incident neutron to the energy of the scattered neutron and the angle of scattering $\theta$. If any two of these three quantities are known, then the third can be obtained. Similarly, the relationship between the incident neutron energy, the recoil proton energy and the angle of scattering can be expressed as:

$$K_p = K_n \sin^2(\theta) \quad (9)$$

Various embodiments of a neutron source detector, which use the foregoing relationships to detect and determine the energy spectrum of a neutron source and a direction to the neutron source, will now be described.

Figure 8:
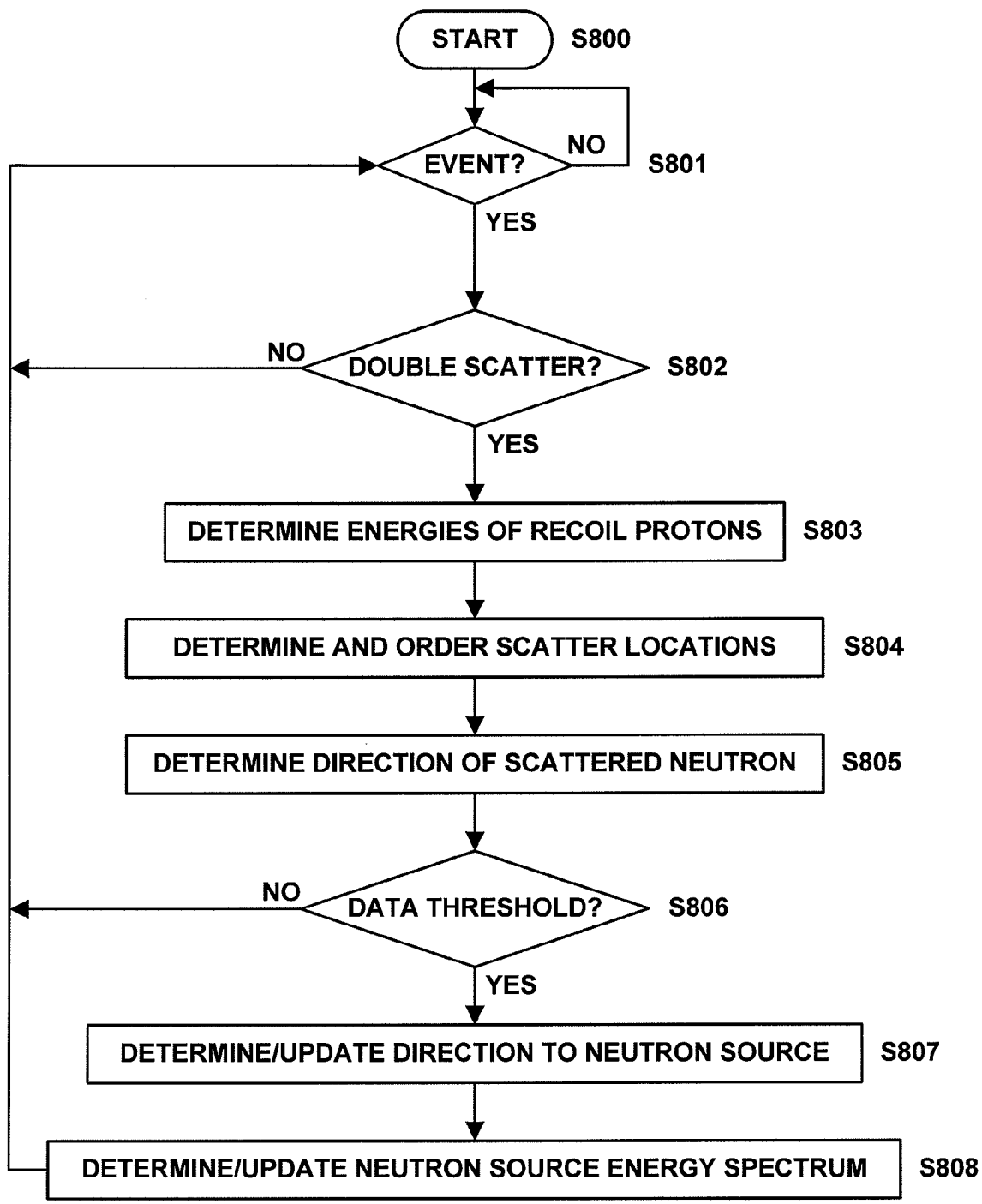
FIG. 8 is a flowchart depicting an operating process of a neutron source detector according to one embodiment of the invention.

FIG. 8 is a flowchart depicting an operating process of neutron source detector 10 according to one embodiment of the invention. Briefly, the operating process is initiated in step S800 and waits for a scattering event of an incident neutron within detector 11 in step S801. Upon the occurrence of a scattering event, it is determined in step S802 whether the incident neutron scattered twice within detector 11. If the incident neutron only scattered once or scattered more than two times, the process returns to step S801 to await the next scattering event. If the incident neutron scattered twice within detector 11, the process proceeds to step S803 where the energies of the recoil protons produced by the two scatterings are determined and stored. In step S804 the locations and ordering of the two scatterings are determined and stored and in step S805 the direction of the scattered neutron is determined and stored. In step S806, the number of double scattering events for which information (i.e., recoil proton energy, scatter locations, scattered neutron direction) has been determined and stored is compared against a threshold value. If the number of double scattering events does not exceed the threshold value, the process returns to step S801 to await the next scattering event. If the number of double scattering events equals or exceeds the threshold value, the process continues to step S807, where a direction to the neutron source is determined based on the stored information from the double scattering events, and to step S808, where an energy spectrum of the neutron source is determined based on the stored information of the double scattering events. Finally, the process returns to step S801 to await the next scattering event. The foregoing process steps will now be described in more detail.

As noted above, the operating process depicted in the flowchart of FIG. 8 is initiated in step S800. The process is launched by a user selecting and executing an instruction sequence in processor 13. The process continues until stopped by the user or, alternatively, in response to an event or timing programmed into the executed instruction sequence.

In step S801, neutron source detector 10 waits for a scattering event of an incident neutron within detector 11. The occurrence of a scattering event may be determined based on a triggering mechanism or at a preset, regular interval, as described above. The occurrence of a scattering event results in the creation of an x-y event list and a y-z event list. The operating process may remain in a hold state in step S800 until the x-y event list and the y-z event list are stored and ready for further processing.

As noted above, in a detector 11 configured to be compatible with the detection of recoil electrons produced by a scattered gamma ray and recoil protons produced by a scattered neutron the majority of the recoil protons have insufficient energy to travel beyond the fiber-optic scintillator 14 in which they are generated. This embodiment of the invention is designed to analyze an incident neutron based on two sequential scatterings of the incident neutron within the detector 11 in which the produced recoil protons do not traverse multiple fiber-optic scintillators 14. The event lists are examined in step S802 to determine the number of scatterings of the incident neutron, and consequently the number of produced recoil protons, within detector 11.

Using techniques similar to those described in Parent application Ser. Nos. 10/866,760 and 11/837,454, entries in the x-y and y-z event lists are aggregated into clusters. For example, the entries in each list are traversed and aggregated into clusters using the coordinates associated with each entry. Initially, a first entry in the event list is assigned to a cluster. The coordinates of the next entry in the event list are compared against the coordinates of the first entry assigned to the cluster to determine if the locations of the two entries are adjacent to each other. If the entry locations are adjacent, the entry is added to the cluster. If the entry locations are not adjacent, the entry is assigned to another cluster. Each subsequent entry is examined in a similar manner by comparing its coordinates against those of entries already assigned to clusters. If the location of the subsequent entry is adjacent to the location of another entry assigned to a cluster, the subsequent entry is assigned to that cluster. The process continues until all entries in the event list have been examined and assigned to a cluster. If multiple clusters become linked by one or more entries adjacent to entries in each of the multiple clusters, the multiple clusters are grouped together as a single cluster. This process is performed for both the x-y event list and the y-z event list.

As discussed above, the locations of entries in an event list are examined to determine if they are adjacent to the locations of other entries in the event list. In an alternative implementation, the locations of the entries may not be required to be immediately adjacent to another entry in order to be associated with the same cluster. For example, entries located within a threshold number of pixels (e.g., one, two, three, etc.) of each other, as reflected in the coordinate values of the entries, may be aggregated into the same cluster. The threshold value may vary depending on the characteristics of the detector materials and dimensions. For example, if the expected energies of the scattered protons and/or the associated UV photons are expected to traverse multiple layers of the detector, the threshold value may be set based on the range of the protons and/or UV photons.

After the entries of the x-y event list have been examined and aggregated into clusters and the entries of the y-z event list have been examined and aggregated into clusters, the locations of the clusters in the x-y event list are compared with those in the y-z event list to identify pairs of clusters associated with a single recoil proton. For example, the common coordinate between the two event lists, the y coordinate, may be used to match a cluster from the x-y event list to a corresponding cluster in the y-z event list. If multiple clusters from each event list share y-coordinate values, the clusters from the event lists having the most common y-coordinate values may be deemed to be associated with the same recoil proton. In alternative implementations, the y-coordinates may vary by a set threshold value and still be considered to be associated with a single recoil proton. This threshold value may vary for the reasons discussed above with respect to setting a threshold value for aggregated entries in each event list. Using techniques such as described in the parent applications, the entries of each pair of associated clusters may be combined into a single cluster of entries each containing a three-dimensional coordinate location and scintillation light intensity value representing the three-dimensional location of the recoil proton. Those skilled in the art will recognize a number of techniques that may be used to organize the x-y and y-z event lists to identify the three-dimensional locations of recoil protons within detector 11.

The number of paired clusters indicates the number of recoil protons generated by the scattering event. If the number of recoil protons identified from the event lists does not equal two, the process returns to step S801 to wait for the next scattering event. The event lists associated with scattering events having a different number of recoil protons may be stored for additional processing in other operating processes or they may be discarded.

If the number of produced recoil protons identified from the events lists equals two, the process continues to step S803 during which the energies of the two recoil protons are determined. For each of the recoil protons, the total amount of scintillation light recorded by sensor 12 at locations associated with the particular recoil proton is determined based on the stored intensity values for each location that produced scintillation light. The relationship between the amount of scintillation light generated by a recoil proton and the energy of the recoil proton may not be linear. Calibration techniques may be used to populate a look-up table that is referenced to determine the energy of a recoil proton using the sum of the light intensities recorded in the cluster associated with the recoil proton. Alternatively, a function may be derived using the look-up table entries and applied to the sum of light intensities.

Energy calibration may be performed using actual testing of detector 11. For example, the material used to make detector 11 may be subjected to protons having known energies. A look-up table is populated by measuring amounts of scintillation light generated by the material upon interaction with incident protons having a range of energies. Those skilled in the art will recognize other testing techniques may be used populate the look-up table and/or generate a functional relationship of light yield to proton energy.

In step S804, the scatter locations where the incident neutron scattered within detector 11 and the order in which the scatterings took place are determined. Using the clustered entries from the event lists associated with each recoil proton, the location at which the scatterings took place is determined. According to one embodiment of the invention, a centroid of the locations of the entries in the cluster associated with a recoil proton is computed to determine the scatter location where the recoil proton was produced. In calculating the centroid, the recorded locations may be weighted based on the light intensities associated with each entry in the cluster. As the number of photons produced and detected by detector 11 increases, the distribution of photons (light intensity) around the fiber-optic scintillator in which the recoil proton originated reflects where within that fiber the recoil proton was produced. Accordingly, the scatter locations may be determined with sub-fiber-diameter accuracy.

Once the scatter locations have been identified, the scatter locations are ordered to identify the order of occurrence of the scatterings. The energy of a scattered neutron is lower than that of the incident neutron prior to scattering. Accordingly, the energy of a recoil proton generated by a second scattering is, on average, lower than the energy of a recoil proton generated by a first scattering. This tendency was confirmed using a Monte Carlo simulation which showed that with a threshold energy of about 300 keV for each proton, the correct ordering was obtained about 60% of the time for 1 MeV neutrons and about 75% of the time for 5 MeV neutrons. Based on the energies determined for each recoil proton, the scatter location associated with the recoil proton having the higher energy is determined to be the first scatter location and the recoil proton having the lower energy is determined to be the second scatter location.

In step S805, the direction of the scattered neutron after the first scattering of the incident neutron is determined. The direction of this scattered neutron is determined using the scatter locations determined for each scattering of the neutron. Specifically, the direction is determined to be a vector from the determined first scatter location to the determined second scatter location. For example referring to FIG. 2, the direction of the scattered neutron n1 is determined to be a vector from scatter location V1 to scatter location V2.

A data set containing each of the energies of the recoil protons, the ordered scatter locations and the direction of the scattered neutron is stored for each scattering event upon completion of the respective steps in the operating process. In step S806, the number of data sets, and hence scattering events, is compared against a threshold number. Process steps S807 and S808 are not performed until a specified number of double scattering events have been recorded and the respective data sets determined and stored. For example, the process may wait for 10 to 20 double scattering events to be recorded before processor 13 uses the stored data sets for those events to determine/update the direction to the source of the incident neutrons and the energy of that neutron source. If the number of data sets does not equal or exceed the threshold number, the operating process returns to step S801 to await the next scattering event.

If the number of recorded data sets equals or exceeds the threshold number, the direction to the neutron source is determined in step S807. Neutron scattering is cylindrically symmetric about the direction of the incident neutron. Accordingly, the average of a statistical sample of the vectors of the scattered neutrons is determined to be the direction to the neutron source. According to one embodiment of the invention, processor 13 retrieves the direction vectors of the scattered neutrons, which are stored in computer-readable media, and computes the mean of the direction vectors. By reversing the mean of the direction vectors, a direction to the neutron source may be provided and stored by processor 13 to assist a user in locating the neutron source. As more scattering events and the associated data sets are recorded, processor 13 recomputes and updates the direction to the neutron source by incorporating the new direction vector in the mean calculation in step S807 as long as the number of scattering events exceeds the threshold value. As the number of recorded double scattering events increases, the accuracy of the determined direction to the neutron source also improves. Factors that affect the accuracy of this determination include the strength of the neutron source, the distance between neutron source detector 10 and the neutron source, the amount of background noise, etc.

To account for changing positions of the neutron source and neutron source detector 10, the number of recorded data sets associated with double scattering events used to calculate the direction to the neutron source may be limited to a specified number of events. For example, processor 13 may use only the most recent 200 to 300 recorded data sets when calculating the direction to the neutron source. By using the most recent recorded scattering events, old direction and energy data associated with a neutron source is slowly phased out of the processing. One skilled in the art will recognize that the number of recorded double scattering events used in the processing may vary from the 200 to 300 range without departing from the scope of the invention.

In step S808, the determined neutron source direction is used to determine an energy spectrum of the neutrons emitted by the neutron source. According to one embodiment of the invention, an angle of scattering of the incident neutron from each of the recorded double scattering events is determined using the neutron source direction and the respective direction vectors between the scatter locations of the scattering events. Referring to FIG. 2, the scatter angle θ1 is determined for each scattering event using the determined neutron source direction and the direction vector between scatter locations V1 and V2. The energy of the incident neutron is then solved for using equation (9) set forth above.

Processor 13 stores the determined energy of each of the incident neutrons on a computer-readable medium. The energy spectrum of the neutron source is represented by the collection of determined energies for the incident neutrons associated with the scattering event data sets used for calculating the neutron source direction. As more double scattering events are recorded and processed, the energy spectrum of the neutron source is updated to include the determined energies for the incident neutrons.

Processor 13 is configured to store and make the energy spectrum and the direction to the neutron source available to a user through any of a number of mechanisms. For example, the determined direction may be used to control the movement of a video camera, thereby keeping the video camera pointed at the location of the neutron source. In this manner, a moving neutron source can be detected and tracked using one or more neutron source detectors. The determined direction to the neutron source also may be used to overlay graphics on a video or still image captured by a camera aligned with the neutron source detector. Alternatively, if the neutron source detector is mounted on a moving vehicle such as a helicopter, the direction of the vehicle can be guided using the determined direction to lead the vehicle to the neutron source.

Both the determined energy spectrum and the direction to the neutron source may be displayed to a user on a monitor coupled to processor 13. The information may be presented in a number of different graphical representations. For example, the energy spectrum of the neutron source may be represented using a histogram of the different energies determined for the different incident neutrons associated with the reconstructed recoil protons.

Figure 9:
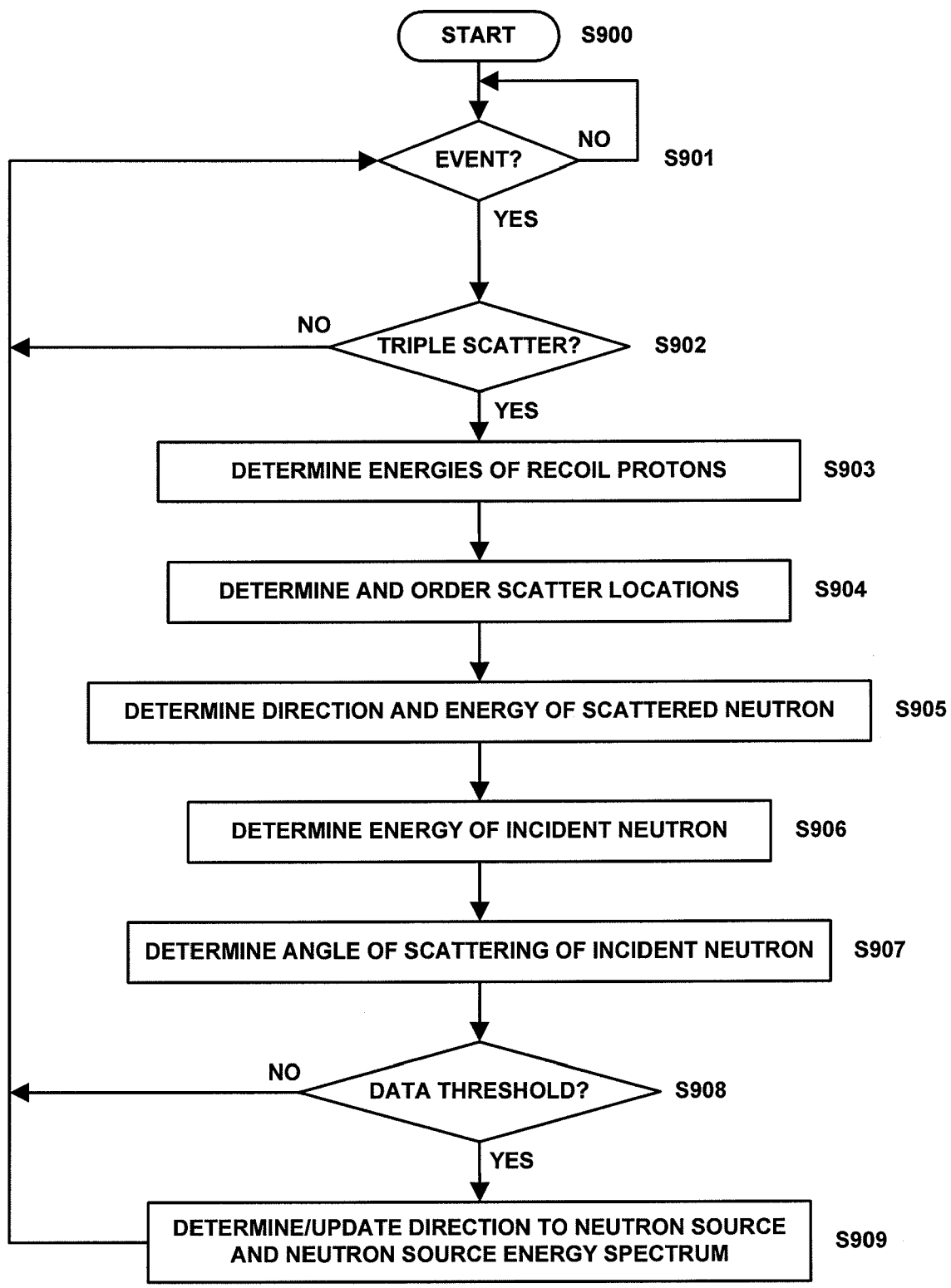
FIG. 9 is a flowchart depicting an operating process of a neutron source detector according to one embodiment of the invention.

FIG. 9 is a flowchart depicting an operating process of neutron source detector 10 according to another embodiment of the invention. Briefly, the operating process is initiated in step S900 and waits for a scattering event within detector 11 in step S901. Upon the occurrence of a scattering event, it is determined in step S902 whether the incident neutron scattered three times within detector 11. If the incident neutron scattered fewer than three times or more than three times, the process returns to step S901 to wait for the next scattering event. If the incident neutron scattered three times, the process continues to step S903 where the energies of the recoil protons produced by the three scatterings are determined and stored. In step S904, the locations and ordering of the three scatterings are determined and in step S905 the direction and energy of the scattered neutron are determined and stored. In steps S906 and S907 the energy and angle of scattering of the incident neutron are determined and stored. In step S908, the number of triple scattering events for which information (i.e., recoil proton energy, scatter locations, scattered neutron energy, scattered neutron direction, etc.) has been determined and recorded by processor 13 is compared against a threshold value. If the number of triple scattering events does not exceed the threshold value, the process returns to step S901 to await the next scattering event. If the number of triple scattering events equals or exceeds the threshold value, the process continues to step S909, where a direction to the neutron source is determined/updated and an energy spectrum of the neutron source is determined/updated. Finally, the process returns to step S901 to await the next scattering event. The foregoing steps will now be described in more detail.

The operating process represented in FIG. 9 is initiated in step S900. As with the process represented in FIG. 8, this process is launched by a user selecting and executing an instruction sequence in processor 13. The process continues until stopped by a user or, alternatively, in response to an event or timing programmed into the executed instruction sequence.

In step S901, neutron source detector 10 waits for a scattering event of an incident neutron within detector 11. The occurrence of a scattering event may be determined based on a triggering mechanism or at a preset, regular interval, as described above. The occurrence of a scattering event results in the creation of an x-y event list and a y-z event list. The operating process may remain in a hold state in step S900 until the x-y event list and the y-z event list are stored and ready for further processing.

As noted above, in a detector 11 configured to be compatible with the detection of recoil electrons produced by a scattered gamma ray and recoil protons produced by a scattered neutron, the majority of the recoil protons have insufficient energy to travel beyond the fiber-optic scintillator 14 in which they are generated. This embodiment of the invention is designed to analyze an incident neutron based on three sequential scatterings of the incident neutron within the detector 11 in which the produced recoil protons do not traverse multiple fiber-optic scintillators 14. The event lists are examined in step S902 to determine the number of scatterings of the incident neutron, and consequently the number or produced recoil protons, within detector 11.

The same techniques described above with respect to the process represented in FIG. 8 may be applied to the event lists to aggregate entries in the event lists into clusters corresponding to recoil protons. If the number of produced recoil protons identified from the event lists does not equal three, the process returns to step S901 to wait for the next scattering event. The event lists associated with scattering events having a different number of recoil protons may be stored for additional processing in other operating processes or they may be discarded.

If the number of produced recoil protons identified from the event lists equals three, the process continues to step S903 during which the energies of the three recoil protons are determined. The process for determining the energy of each recoil proton is the same as that described above with respect to the process represented in FIG. 8 and therefore will not be repeated here.

Once the energies of the recoil protons have been determined, the scatter locations within detector 11 for each of the three scatter locations are determined and ordered in step S904. The determination of the scatter locations uses the same techniques described above with respect to the process represented in FIG. 8 and will not be repeated here.

Referring back to FIG. 2, a triple scattering event is depicted in which an incident neutron n is scattered three times at scatter locations V1, V2 and V3. The maximum angle of scattering of a neutron from a proton is 90°, and therefore a triangle formed using the three scatter locations is either a right triangle or obtuse. According to one embodiment of the invention, the scatter location forming the vertex of the right/obtuse angle is determined to be the second scattering location of the incident neutron, which is V2 in the triple scattering event depicted in FIG. 2. In a manner similar to that described above with respect to FIG. 8, the remaining two scatter locations are ordered based on the energy of the recoil proton produced at each respective location. Accordingly, the scatter location that produced the recoil proton having the higher energy is determined to be the first scatter location and the scatter location that produced the recoil proton having the lower energy is determined to be the third scatter location. A Monte Carlo simulation was run for recoil protons having a threshold energy of about 200 keV. The simulation indicated that the ordering of scatter locations obtained using the technique described above was correct 64% of the time for incident neutrons having an energy of 1 MeV and 85% of the time for neutrons having an energy of 5 MeV.

In step S905, the direction and energy of the scattered neutron is determined using the determined scatter locations and recoil proton energy. The direction of the scattered neutron is determined using the ordered scatter locations determined for each scattering of the incident neutron. Referring to FIG. 2, the direction of scattered neutron n1 is determined to be a vector from V1 to V2. Similarly, the direction of scattered neutron n2 is determined to be a vector from V2 to V3. Using these two direction vectors, a scatter angle $\theta_2$ at scatter location V2 is determined. Using the following equation based on equation (9) shown above, the energy of scattered neutron n1 is determined:

$$K_{n1} = \frac{K_{p2}}{\sin^2(\theta_2)} \quad (10)$$

where $K_{p2}$ is the energy of the recoil proton produced by the scattering of the neutron at V2.

Once the energy of scattered neutron n1 is determined, the energy of the incident neutron n is determined in step S906. The incident neutron energy $K_n$ is equal to the sum of the energy $K_{n1}$ of the scattered neutron n1 and the energy $K_{p1}$ of the recoil proton produced at the first scatter location V1.

With the determined energy of the incident neutron and the energy of the recoil proton produced at the scatter location V1, the angle of scattering $\theta_1$ of the incident neutron at V1 is determined using the following equation based on equation (9) shown above:

$$\sin(\theta_1) = \sqrt{\frac{K_{p1}}{K_n}} \quad (11)$$

The direction of the incident neutron n is determined to be within a cone of half angle $\theta_1$ about the axis defined by scatter locations V1 and V2.

A data set containing the energies of the recoil protons, the ordered scatter locations, the direction and energy of the scattered neutron, the energy of the incident neutron, and the angle of scattering of the incident neutron is stored on a computer-readable medium by processor 13 for each of the triple scattering events upon the completion of the respective process steps described above. In step S908, the number of triple scattering events represented by the stored data sets is compared against a threshold number. The threshold number represents a minimum number of triple scattering events needed in order for the information derived from the data sets in step S909 to be meaningful.

In step S909, a direction to the neutron source and an energy spectrum of the neutron source are determined based on the information contained in the data sets of the processed triple scattering events. According to one embodiment of the invention, the intersection of cones having half angles $\theta_1$ for the triple scattering events is determined to derive a direction to the neutron source. A minimum of three cones derived from triple scattering events are needed to determine a direction to the neutron source. Accordingly, the threshold number compared against in step S908 is at least three. To determine the direction to the neutron source, processor 13 retrieves the stored scattering angles, scatter locations and direction vectors for recorded triple scattering events once the number of events reaches the threshold number. Processor 13 then determines the intersection of the cones having half angles of the respective scattering angles about the respective axes defined by the scatter locations. The cone intersection determines the direction to the neutron source. As more triple scattering events and the associated data sets are recorded, processor 13 re-computes and updates the direction to the neutron source by incorporating the cone derived from the new data set into the intersection calculation. As the number of recorded triple scattering events increases, the accuracy of the determined direction to the neutron source improves.

An energy spectrum of the neutron source is compiled by processor 13 using the determined energies of the incident neutrons from the stored data sets. As with the direction to the neutron source, the energy spectrum of the neutron source is updated by processor 13 when additional triple scattering events are recorded and associated data sets stored.

The determined direction to the neutron energy source and energy spectrum of the energy source are stored and made available to a user in the same manner as described above with respect to the operating process represented in FIG. 8.

Figure 10:
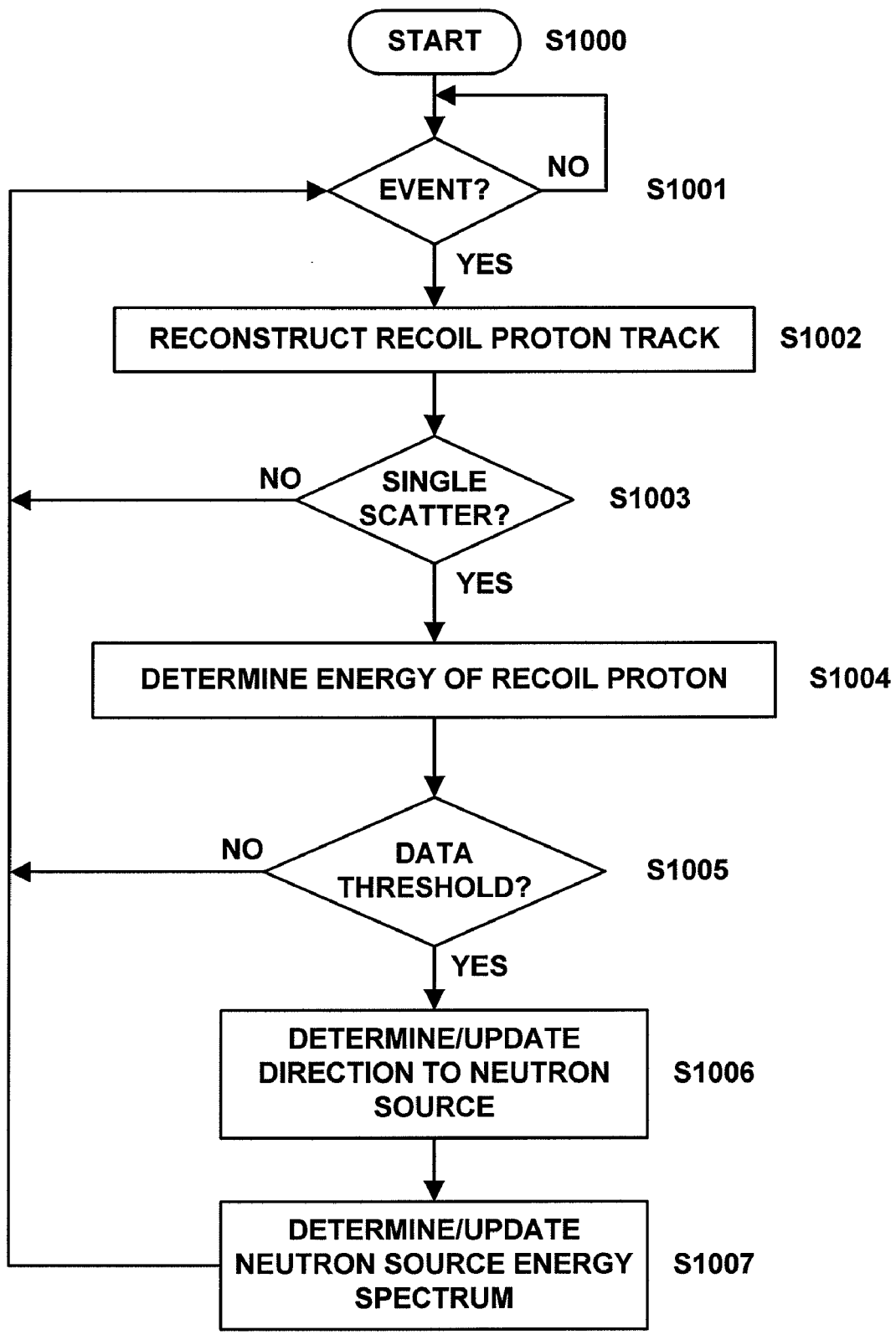
FIG. 10 is a flowchart depicting an operating process of a neutron source detector according to one embodiment of the invention.

FIG. 10 is a flowchart depicting an operating process of neutron source detector 10 according to another embodiment of the invention. As shown in FIG. 10, the operating process is initiated in step S1000 and neutron source detector 10 waits for a scattering event in step S1001. The occurrence of a scattering event may be determined based on a triggering mechanism or at a regular interval, as described above. Upon the occurrence of a scattering event, the track of the produced recoil proton is reconstructed by determining the energy and the direction of the recoil proton in step S1002. If more than one recoil proton track was recorded for the scattering event, the operating process returns to step S1001 to await the next scattering event (step S1003). If only one recoil proton track was recorded for the scattering event, the energy and the direction of the recoil proton track are determined and stored for further processing (step S1004). In step S1005, it is determined whether the number of recoil proton tracks (energy and direction) stored exceeds a data threshold. If the data threshold has not been exceeded, processing returns to step S1001 to await the next scattering event. If the data threshold has been exceeded, the direction to the neutron source is determined/updated in step S1006 and the energy spectrum of the neutron source is determined/updated in step S1007. The operating process then returns to step S1001 to await the next scattering event. This operating process is initiated by a user selecting and executing an instruction sequence in processor 13. The process continues until stopped by the user. The operating process will now be described in more detail.

The occurrence of a scattering event results in the creation of an x-y event list and a y-z event list. As describe above, these event lists may be generated at regular intervals or in response to a trigger. The operating process remains in a hold state in step S1001 until an x-y event list and a y-z event list are ready for further processing.

Once an x-y event list and a y-z event list are ready for processing, the operating process proceeds to step S1002 where the recoil proton track is reconstructed. Reconstruction of the recoil proton track involves a process for determining the direction and the energy of the recoil proton. First, the data entries in each event list are sorted and isolated into lists for individual recoil protons. Second, using the data entries for each recoil proton, the recoil proton track is reconstructed by determining the starting point, direction and energy of the recoil proton associated with the recoil proton track. Processes for reconstructing recoil electron tracks are described in detail in parent application Ser. Nos. 10/866,760 and 11/837,454. As will be understood by those skilled in the art, these processes may be applied to neutrons and recoil protons in place of the gamma rays and recoil electrons discussed in the parent applications. According to one embodiment of the invention, these processes are used to reconstruct recoil proton tracks produced upon the scattering of incident neutrons within detector 11 and store the properties of the recoil proton tracks (i.e., starting/ending points, direction, etc.) in step S1002.

In step S1003, the results of step S1002 are reviewed by processor 13 to determine if more than one recoil proton track was produced by the recorded scattering event. Similar to the process described in parent application Ser. No. 11/837,454, recoil proton tracks produced by single scatterings of incident neutrons are used to determine an energy spectrum of the source of the neutrons and a direction to the neutron source. Unlike the previous embodiments of neutron source detector 10 described above, this embodiment uses recoil protons that gain enough energy from the neutron scatterings to traverse a track through multiple layers of detector 11. If the incident neutron is scattered more than once, thereby producing multiple recoil protons for a scattering event, or if the scattered neutron did not impart sufficient energy in the recoil proton for it to traverse a track within detector 11, the process returns to step S1001 to await the next scattering event. If multiple recoil protons are produced by the scattering event, the stored data associated with the scattering event may be discarded or stored for other processing.

If a single recoil proton track is produced by the scattering of an incident neutron, the energy of the recoil proton is determined is step S1004. As discussed above with respect to the processed represented in FIGS. 8 and 9, an energy calibration of detector 11 may be performed to populate a look-up table and/or generate a function to correlate light yield with proton energy. The calibration techniques mentioned above may be used in this embodiment to perform the energy calibration. Using the look-up table or generated function, processor 13 determines the energy of the recoil proton based on the total amount of light recorded for the recoil proton track, which is obtained by adding the recorded light intensity yields for each of the entries in the recoil proton track. The determined recoil proton energy is stored along with the properties of the recoil proton track for further processing by processor 13.

In alternative embodiments of the invention, other conditions besides having multiple recoil protons may be used to disregard a reconstructed recoil proton track. For example, if the reconstructed recoil proton track intersects the edge of detector 11, the determined energy for the recoil proton may be inaccurate since the recoil proton may have continued movement outside the range of detector 11 or sensor 12. In this situation, such a recoil proton track may be removed from further processing to avoid introducing this inaccuracy into the system.

In step S1005, the number of reconstructed recoil proton tracks having a determined energy and direction stored by processor 13 is compared against a data threshold number. The process depicted in FIG. 10 does not proceed to steps S1006 and S1007 until a specified number of scattering events have been recorded and associated recoil proton tracks reconstructed. For example, the process may wait for 10 or 20 events to be recorded before processor 13 uses the recorded events to determine/update the direction to the neutron source and the energy spectrum of the neutron source. In this manner, processing resources can be conserved until the number of recorded events reaches a point that will have a significant impact on the determined/updated direction and energy spectrum. One skilled in the art will recognize that this data threshold may be set to a different value than 10 or 20 without departing from the scope of the invention.

In step S1006, the direction to the neutron source is determined based on the determined direction of the recoil proton track. As noted above, for each single scattering event for which a recoil proton track is reconstructed by processor 13, the direction of the recoil proton track is stored in one or more computer-readable media by processor 13. The direction to the neutron source is determined by processor 13 by computing the mean of the directions of the stored recoil proton tracks and reversing the computed mean direction. As more recoil proton tracks are reconstructed, processor 13 re-computes and updates the direction to the neutron source by incorporating the new recoil proton directions in the mean calculation in step S1006 once the number of new recoil proton tracks exceeds the number of the data threshold.

As the number of recorded scattering events increases, the accuracy of the determined direction to the neutron source improves as well. In general, the error in the determined direction to the neutron source is approximately the range of directions determined for the recoil protons divided by the square root of the number of reconstructed recoil protons included in the direction determination. Factors that will affect the accuracy of neutron source detector 10 include the strength of the neutron source, the distance between the neutron source and neutron source detector 10, the amount of background noise (i.e., neutrons from other sources besides the desired neutron source), etc.

To account for changing positions of the neutron source and/or neutron source detector 10, the number of recorded recoil proton tracks used to calculate the direction to the neutron source may be limited to a specified number of events. For example, processor 13 may use only the most recent 200 or 300 recorded events when calculating the direction to the neutron source. By using the most recent recorded events, old direction and energy data identifying a location and source which has since changed is slowly phased out of the processing. One skilled in the art will recognize that the number of reconstructed recoil protons included in the processing may vary from the 200 or 300 without departing from the scope of the invention.

Once the direction to the neutron source has been determined/updated in step S1006, the process proceeds to step S1007 where the energy spectrum of the neutron source is determined. Using the mean direction to the neutron source determined in step S1006, the energy spectrum of the neutron source is determined in step S1007 using equation (9). As indicated above, each reconstructed recoil proton track is stored by processor 13. In step S1007, the energy of an incident neutron associated with each reconstructed recoil proton track is determined using equation (9). Processor 13 stores the determined energy for each of the incident neutrons on a computer-readable medium. The energy spectrum of the neutron source is represented by the collection of determined energies for the incident neutrons. As more recoil protons are reconstructed in the process, the energy spectrum of the neutron source is updated to include the new incident neutron energy associated with the reconstructed recoil proton. Similar to step S1006, the energy spectrum of the neutron source is determined/updated once the number of reconstructed recoil protons reaches the data threshold. In addition, the energy spectrum may be determined using a specified number of the most recent reconstructed recoil protons, as described above with respect to step S1006.

Processor 13 is configured to store and make the energy spectrum and the direction to the neutron source available through any of a number of mechanisms, as described above with respect to the operating processes represented in FIGS. 8 and 9.

The operating processes represented in FIGS. 8, 9 and 10 have been described as focusing on only one type of scattering event for each process (e.g., single scatter generating recoil proton track, double scatter, triple scatter). One skilled in the art will recognize that two or more of those operating processes may be executed simultaneously by processor 13 and each recorded scattering event is examined to determine whether the number of recoil protons produced within the detector matches with the number used in one of the operating processes being executed. For example, if the processes represented in FIGS. 8 and 9 are executed simultaneously, each scattering event is examined and if a single recoil proton is produced, the scattering event is processed further using the process in FIG. 10. If the incident neutron scatters twice within the detector producing two recoil protons, the scattering event is processed using the process in FIG. 8.

An advantage of the neutron source detector 10 described herein is that a gamma vector camera, such as that described in the parent applications, may be modified and operated in such a manner that it can be used to detect and identify both gamma ray sources, as in the parent applications, and neutron sources, as described herein. Applying the considerations described in the parent applications and herein, detector 11 and sensor 12 can be constructed to scatter both gamma rays and neutrons as well as detect and record the recoil electrons and recoil protons produced by the scatterings. Processor 13 is configured to differentiate between recoil protons and recoil electrons within detector 11 and execute the appropriate algorithms for analyzing the type of scattering event (i.e., neutron scattering or gamma ray scattering).

As discussed in connection with the embodiments described above, the entries of the x-y event list and the y-z event list are aggregated into groups corresponding to respective recoil protons. In a configuration in which either incident gamma rays or incident neutrons may be detected, these aggregated groups of entries are analyzed using statistical criteria to determine if they represent the location and energy of a recoil proton or the location and energy of a recoil electron. This differentiation is possible due to the different rates of energy loss exhibited by protons and electrons and the different ranges of protons and electrons in the material used for detector 11. At a given energy level, protons lose energy at a much higher rate than electrons. For example, in polystyrene a 1 MeV electron may have a track length of 4 mm in detector 11 while a 1 MeV proton may have a track length of 23 $\mu$m. Using energy calibration, like that mentioned above, processor 13 may be configured to distinguish between recoil electrons and recoil protons based on threshold values of the scintillation light detected and the distance within detector 11 over which that scintillation light is produced.

The statistical criteria used to distinguish between electrons and protons include the total amount of light intensity recorded in the cluster and the spread of the entry locations relative to the center of the cluster, which is typically greater for recoil electrons. For example, if the total amount of light intensity recorded in a cluster of entries is greater than a threshold value and the spread of the entry locations relative to the center of the cluster is less than a threshold value, the cluster is determined to represent the location and energy of a recoil proton. If either of the two conditions are not satisfied, the cluster is determined to represent the location and energy of a recoil electron. As noted above, the timing or triggering mechanism used to record scattering events is configured to preferably capture the scattering(s) of a single incident neutron or single incident gamma ray. Accordingly, if any one cluster aggregated from an event list is determined to represent a recoil electron produced by the scattering of an incident gamma ray, the other clusters aggregated from the event list are deemed to represent recoil electrons produced by other scatterings of the same incident gamma ray. The threshold values will vary depending on the materials and dimensions of the detector as well as the expected energies of the incident neutrons and gamma rays. These threshold values may be set based on testing and/or simulations known to those skilled in the art.

Once a determination is made as to whether the scattering event involved a scattered gamma ray producing a recoil electron or a scattered neutron producing a recoil proton, the appropriate process may be executed by processor 13 to determine the source and direction to the source. In addition, an appropriate algorithm may be selected from those described above as well as in the parent applications and executed in accordance with the number of recoil electons/protons generated in the scattering event. Accordingly, a single device may be configured to detect the energy spectrum and the direction to the source of either gamma rays or neutrons in accordance with the arrangements described herein and in the parent applications.

The foregoing description is provided to enable one skilled in the art to practice the various embodiments of the invention described herein. Various modifications to these embodiments will be readily apparent to those skilled in the art, and generic principles defined herein may be applied to other embodiments. Thus, the following claims are not intended to be limited to the embodiments of the invention shown and described herein, but are to be accorded the full scope consistent with the language of the claims. All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A neutron source detector for detecting and determining an energy spectrum of a neutron source and a direction to the neutron source, said neutron source detector comprising:
    a detection system configured to detect and record the location and energy of interaction between a detector and a recoil proton produced by a scattering of a neutron emitted by the neutron source;
    a processor configured to:
    determine the energy of each of a plurality of recoil protons produced by respective scatterings of a neutron based on the recorded locations and energies of interactions between said detector and the plurality of recoil protons,
    determine and order scatter locations of the scattered neutron based on the determined energies of the recoil protons,
    determine a direction of the scattered neutron based on the order of the scatter locations,
    determine the direction to the neutron source based on the determined directions of a plurality of scattered neutrons, and
    determine the energy spectrum of the neutron source based on the determined direction to the neutron source, the determined directions of the plurality of scattered neutrons, and the determined energies of the plurality of recoil protons produced by the respective plurality of scattered neutrons.

2. The neutron source detector according to claim 1, wherein said processor is configured to determine the scatter locations by calculating a centroid for each of the recoil protons based on the respective recorded locations.

3. The neutron source detector according to claim 1, wherein said processor is configured to determine the direction to the neutron source based on an average of the determined directions of the plurality of scattered neutrons.

4. The neutron source detector according to claim 1, wherein the processor is configured to determine the energy spectrum of the neutron source based on the determined energies of the plurality of recoil protons and the angle between the determined directions of the scattered neutrons and the determined direction to the neutron source.

5. The neutron source detector according to claim 1, wherein said detector generates scintillation light upon interaction with the recoil proton, and said detection system comprises a sensor configured to record the locations and the intensities of the scintillation light generated by said detector,
    wherein said processor is configured to determine the energy of the recoil proton based on the recorded intensities of the scintillation light recorded by said sensor.

6. The neutron source detector according to claim 5, wherein said detector comprises a plurality of layers arranged on respective parallel planes, wherein each layer comprises a plurality of fiber-optic scintillators arranged parallel to each other on the plane of the layer in a direction orthogonal to the direction of the fiber-optic scintillators in adjacent layers.

7. The neutron source detector according to claim 6, wherein the fiber-optic scintillators comprise a first dye for absorbing ionization energy of the recoil proton and for emitting ultraviolet light and a second dye for absorbing ultraviolet light and emitting visible light.

8. The neutron source detector according to claim 7, wherein the mean free path of the emitted ultraviolet light is one to two times the width of one of the fiber-optic scintillators.

9. The neutron source detector according to claim 6, wherein said sensor comprises:
    a first photo sensor configured to record the locations and the intensities of scintillation light generated by a plurality of the fiber-optic scintillators arranged in a first direction; and
    a second photo sensor configured to record the locations and the intensities of scintillation light generated by a plurality of fiber-optic scintillators arranged in a second direction orthogonal to the first direction.

10. The neutron source detector according to claim 9, wherein said first photo sensor comprises a first photo sensor array having a plurality of elements in correspondence with the plurality of fiber-optic scintillators from which said first photo sensor array detects scintillation light, and said second photo sensor array comprises a second photo sensor array having a plurality of elements in correspondence with the plurality of the fiber-optic scintillators from which said second photo sensor array detects scintillation light, and wherein the locations of the scintillation light are determined based on which elements of the first and second photo sensor arrays detect the scintillation light.

11. The neutron source detector according to claim 10, wherein said sensor further comprises:
    a first image intensifier coupling the plurality of fiber-optic scintillators arranged in the first direction to said first photo sensor array; and
    a second image intensifier coupling the plurality of fiber-optic scintillators arranged in the second direction to said second photo sensor array,
    wherein said first and second photo sensor arrays are configured to record the locations and the intensities of the scintillation light generated in said detector upon a coincident detection of light in said first and second image intensifiers.

12. A method for detecting and determining an energy spectrum of a neutron source and a direction to the neutron source, the method comprising the steps of:
    detecting and recording the locations and energies of interactions between a detector and a plurality of recoil protons produced by the scattering of a plurality of neutrons emitted by the neutron source;
    determining the energy of each of the plurality of recoil protons based on the recorded locations and energies of the interactions of the recoil protons;
    determining and ordering scatter locations of the scattered neutrons based on the determined energies of the recoil protons;
    determining a direction of each scattered neutron based on the order of the scatter locations;

determining the direction to the neutron source based on the determined directions of the plurality of scattered neutrons; and determining the energy spectrum of the neutron source based on the determined direction to the neutron source, the determined directions of the plurality of scattered neutrons, and the determined energies of the plurality of recoil protons produced by respective one of the plurality of scattered neutrons.

13. The method according to claim 12, wherein determining the scatter locations comprises calculating a centroid for each of the recoil protons based on the respective recorded locations.

14. The method according to claim 12, wherein determining the direction to the neutron source comprises averaging the determined directions of the plurality of scattered neutrons.

15. The method according to claim 12, wherein the energy spectrum of the neutron source is determined based on the determined energies of the plurality of recoil protons and the angle between the determined directions of the scattered neutrons and the determined direction to the neutron source.

16. The method according to claim 12, wherein recording the locations and energies of the interactions of the plurality of recoil protons comprises recording the locations and intensities of scintillation light generated by the detector upon interaction with the recoil protons.

17. The method according to claim 16, wherein the energies of the plurality of recoil protons are determined based on the recorded intensities of the scintillation light.

18. A computer-readable medium having computer-executable instructions stored thereon for execution by a processor to perform a method for detecting and determining an energy spectrum of a neutron source and a direction to the neutron source, the method comprising the steps of:

detecting and recording the locations and energies of interactions between a detector and a plurality of recoil protons produced by the scattering of a plurality of neutrons emitted by the neutron source;

determining the energy of each of the plurality of recoil protons based on the recorded locations and energies of the interactions of the recoil protons;

determining and ordering scatter locations of the scattered neutrons based on the determined energies of the recoil protons;

determining a direction of each scattered neutron based on the order of the scatter locations;

determining the direction to the neutron source based on the determined directions of the plurality of scattered neutrons; and determining the energy spectrum of the neutron source based on the determined direction to the neutron source, the determined directions of the plurality of scattered neutrons, and the determined energies of the plurality of recoil protons produced by respective one of the plurality of scattered neutrons.

19. The computer-readable medium according to claim 18, wherein determining the scatter locations comprises calculating a centroid for each of the recoil protons based on the respective recorded locations.

20. The computer-readable medium according to claim 18, wherein determining the direction to the neutron source comprises averaging the determined directions of the plurality of scattered neutrons.

21. The computer-readable medium according to claim 18, wherein the energy spectrum of the neutron source is determined based on the determined energies of the plurality of recoil protons and the angle between the determined directions of the scattered neutrons and the determined direction to the neutron source.

22. The computer-readable medium according to claim 18, wherein recording the locations and energies of interactions of the plurality of recoil protons comprises recording the locations and intensities of scintillation light generated by the detector upon interaction with the recoil protons.

23. The computer-readable medium according to claim 22, wherein the energies of the plurality of recoil protons are determined based on the recorded intensities of the scintillation light.

24. A neutron source detector for detecting and determining an energy spectrum of a neutron source and a direction to the neutron source, said neutron source detector comprising:

a detection system configured to detect and record a track of a recoil proton produced by a scattering of an incident neutron emitted by the neutron source; and a processor configured to determine the energy and the direction of the recoil proton based on the track of the recoil proton recorded by said detection system, and to determine the energy spectrum of the neutron source and the direction to the neutron source based on the determined energies and directions of a plurality of recoil protons produced by the single scatterings of a respective plurality of incident neutrons.

25. A neutron source detector for detecting and determining an energy spectrum of a neutron source and a direction to the neutron source, said neutron source detector comprising:

a detection system configured to detect and record the location and energy of interaction between a detector and a recoil proton produced by a scattering of a neutron emitted by the neutron source;

a processor configured to:

determine the energy of each of a plurality of recoil protons produced by respective scatterings of a neutron based on the recorded locations and energies of interactions between the detector and the recoil protons, determine and order three scatter locations of the scattered neutron based on the determined energies of the recoil protons, determine a direction of the scattered neutron after a first scattering and a direction of the scattered neutron after a second scattering based on the order of the three scatter locations, determine the energy of the scattered neutron after the first scattering based on the determined directions of the scattered neutron after the first and second scatterings and the determined energy of the recoil proton produced by the second scattering of the neutron, determine an angle of scattering of the first scattering of the neutron and an energy of the neutron based on the determined energies of the scattered neutron after the first scattering and the recoil proton produced by the first scattering of the neutron, determine the energy spectrum of the neutron source based on the determined energies of a plurality of neutrons, and determine a direction to the neutron source based on the angles of scattering of the first scatterings of the plurality of neutrons.

* * * * *

UNITED STATES PATENT AND TRADEMARK OFFICE
CERTIFICATE OF CORRECTION

PATENT NO. : 7,667,206 B1
APPLICATION NO. : 11/949682
DATED : February 23, 2010
INVENTOR(S) : Munther M. Hindi et al.

It is certified that error appears in the above-identified patent and that said Letters Patent is hereby corrected as shown below:

In Column 9, Line 4: Replace Equation (3) with: $v_n^2 = v_{n1}^2 + v_p^2$

In Column 9, Line 13: Replace Equation (5) with: $v_n = v_{n1} + v_p$

In Column 9, Line 18: Replace Equation (6) with: $v_n^2 = v_{n1}^2 + v_p^2 + 2v_{n1}v_p \cos(\varphi)$ Signed and Sealed this Twenty-sixth Day of October, 2010

David J. Kappos
*Director of the United States Patent and Trademark Office*